US012175261B1

(12) United States Patent
Biermann et al.

(10) Patent No.: US 12,175,261 B1
(45) Date of Patent: Dec. 24, 2024

(54) CONFIGURATION OF END USER DEVICES

(71) Applicant: IGEL Technology GmbH, Bremen (DE)

(72) Inventors: Frank Biermann, Augsburg (DE); Stefan Huber, Augsburg (DE); Andreas Leppert, Baden-Baden (DE)

(73) Assignee: IGEL Technology GmbH, Bremen (DE)

( * ) Notice: Subject to any disclaimer, the term of this patent is extended or adjusted under 35 U.S.C. 154(b) by 0 days.

(21) Appl. No.: 18/651,030

(22) Filed: Apr. 30, 2024

Related U.S. Application Data

(60) Provisional application No. 63/636,077, filed on Apr. 18, 2024.

(51) Int. Cl.
*G06F 9/44* (2018.01)
*G06F 9/445* (2018.01)

(52) U.S. Cl.
CPC .............. *G06F 9/44505* (2013.01)

(58) Field of Classification Search
CPC ............... G06F 9/44; G06F 1/32; G06F 1/12
See application file for complete search history.

(56) References Cited

U.S. PATENT DOCUMENTS

2021/0109981 A1\* 4/2021 Eder-Pressman ... G06F 16/9577
2022/0308752 A1\* 9/2022 Fu ..................... G06F 3/0481

\* cited by examiner

*Primary Examiner* — Keshab R Pandey
(74) *Attorney, Agent, or Firm* — NICHOLSON DE VOS WEBSTER & ELLIOTT LLP

(57) ABSTRACT

A layout description file and a parameter description file are received. The layout description file specifies a configuration page for configuring settings of an application installed on an end user device, and includes parameter page elements. Each parameter page element is used for rendering a user interface (UI) element for that page element, and each parameter page element includes include a parameter identifier that references a set of one or more configuration parameters in the parameter description file. A configuration visualization is dynamically built using the layout description file and the parameter description file, and rendered on a web browser. Through the configuration visualization, at least one change to a configuration setting for the application is received. The configuration setting change is transmitted to a centralized management system for deployment of the configuration to the end user devices.

21 Claims, 7 Drawing Sheets

EXAMPLE LAYOUT DESCRIPTION
140

```
{
  "root": {
312 ...
    },
314 "browserA": {
316   "id" : "browserA",
318   "title" : "Web Browser",
322   "parentId" : "network",
324   "elements" : {
      "0" : {
325     "type" : "generic",
        "paramId" : "home_page"
326   },
      "1" : {
        "type" : "separator"
328   }
      "2" : {
329     "type" : "generic",
        "paramId" : "private_mode"
      }
    }
  }
}
```

FIG. 3

EXAMPLE PARAMETER DESCRIPTION
145

```
{
  "home_page": {
    "uiType": "string",
    "displayName": "Home Page" ...
  },
  ....
  "private_mode": {
    "defaultValue": "enabled",
    "uiType": "editable",
    "range": [
      {
        "id": "enabled",
        "name": "Enabled"
      },
      {
        "id": "disabled",
        "name": "Disabled"
      },
      {
        "id": "forced",
        "name": "Forced"
      }
    ],
  },
```

410 — {
412 — "home_page": {
414 — "uiType": "string",
416 — ....
418 — "private_mode": {
420 — "defaultValue": "enabled",
422 — "range": [

FIG. 4

EXAMPLE LAYOUT DESCRIPTION
140

```
312 ─── {
         "root": {
            ...
314 ───  },
         "browserA": {
322 ───     ...
524 ───     "elements" : {
               "3" : {
526 ───           "type" : "generic",
528 ───           "paramId" : "popup_exceptions"
530 ───           "dependencies": [{
532 ───              "dependentParamID": "popup_config"
534 ───              "dependentParamValues": ["enabled"],
                     "dependencyType": "show"
                  }]
               }
            }
         }
      }
```

FIG. 5

CONFIGURATION OF END USER DEVICES

CROSS-REFERENCE TO RELATED APPLICATIONS

This application claims the benefit of U.S. Provisional Application No. 63/636,007, filed Apr. 18, 2024, which is hereby incorporated by reference.

FIELD

Embodiments of the invention relate to the field of end user devices; and more specifically, to the configuration of end user devices.

BACKGROUND

The configuration of end user devices, such as thin clients, personal computers, mobile devices, or other computing devices, is often necessary to enable the proper functioning of various applications and services. For example, end user devices may need to be configured with specific parameters, such as network settings, security settings, display settings, application settings, or other parameters, depending on the requirements of the applications and services that the end user devices access or execute.

The configuration of end user devices can be challenging and time-consuming, especially when a large number of end user devices need to be configured in a consistent and efficient manner. One approach to address the configuration challenge is using a remote configuration server that can provide configuration information to the end user devices over a network. However, this approach has some limitations. Conventionally, the configuration pages or profiles are defined in code. To change a configuration page of an application, for example, the code would need to be written, compiled, and deployed. This is time consuming and inflexible.

BRIEF DESCRIPTION OF THE DRAWINGS

The invention may best be understood by referring to the following description and accompanying drawings that are used to illustrate embodiments of the invention. In the drawings:

FIG. 3 shows an example layout description file that shows a single page that has multiple elements.

FIG. 4 shows an example parameter description file that corresponds to the example layout description file shown in FIG. 3.

FIG. 5 shows the example layout description file of FIG. 3 including a page element that has a dependencies attribute.

DESCRIPTION OF EMBODIMENTS

Embodiments describe a system for easily defining and constructing configuration pages for applications remotely without the need for customizing a user interface or without updating code. An application developer or administrator can create a set of configuration files that define the layout, the dependencies, and/or the visualization of configuration parameters for the application. For example, a layout description file may define the layout and dependencies for configuration parameters, and a parameter description file may define the values for the configuration parameters. The layout description file defines the layout of a configuration page, where each configuration page can include multiple page elements including one or more parameter page elements and one or more structure page elements. A parameter page element includes a configuration parameter identifier that references a configuration parameter setting in the parameter description file. A structure page element is a UI element to structure the page. Dependencies are defined in a page element attribute of the layout description file. The set of configuration files are interpreted by device configurator that builds the configuration visualization.

Embodiments described herein allow the parameterization of end user devices to be provided automatically in graphical user interfaces of centralized management software. New functionality (e.g., updated configuration options) can be provided without making changes to the administration software or the applications themselves.

Figure 1:
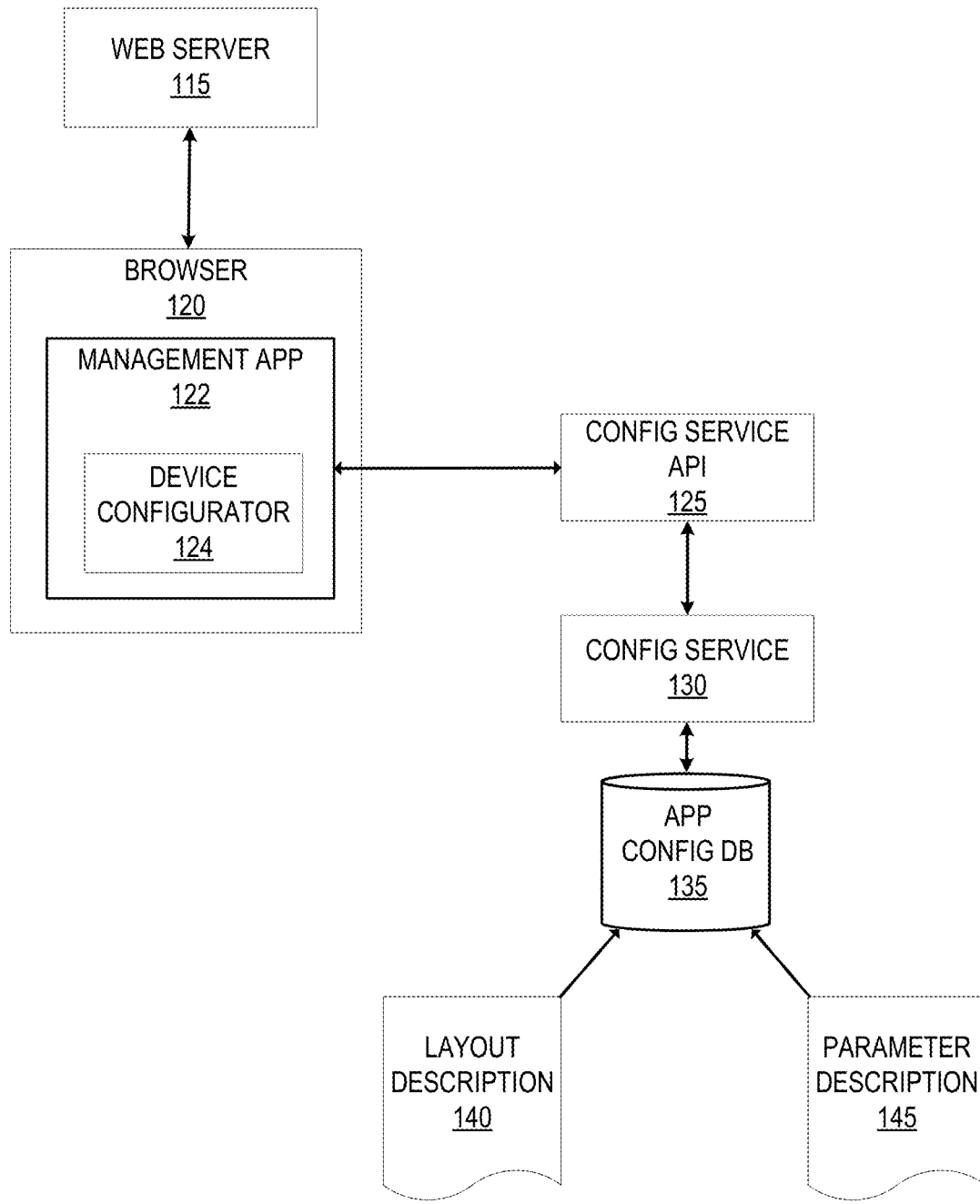
FIG. 1 illustrates an exemplary system for defining and constructing configuration pages for applications remotely without the need for customizing a user interface or without updating code, according to an embodiment.

FIG. 1 illustrates an exemplary system for defining and constructing configuration pages for applications remotely without the need for customizing a user interface or without updating code, according to an embodiment. The system can be used for configuring an operating system, application, and/or hardware components of the device. The configuration may be part of a remote management system for managing an end user device.

The device configurator 124 executes through the web browser 120. The device configurator 124 provides a graphical user interface that can be used by a user (typically a system administrator) for configuring an end user device. For example, the device configurator 124 may be a GUI of a centralized management software for managing devices and/or applications. The end user device is a computing device such as a laptop, a desktop, a workstation, a smartphone, a tablet, a terminal (e.g., point-of-sale system, a kiosk system), a device running an operating system from a stick device (sometimes known as a flash drive or thumb drive), or a wearable device. The end user device may be a thin client device that has minimal hardware and software components and connects to a virtual desktop infrastructure (VDI) or other cloud-based desktop. The device configurator 124 may allow the user to configure the end user device with specific parameters, such as network settings, security settings, display settings, application settings, or other parameters, depending on the requirements of the applications and services that the end user devices access or execute. The device executing the device configurator 124 through the browser 120 is typically different from the end user device that is being configured.

The device configurator 124 is part of a management application 122. For example, the device configurator 124 may be rendered and executed within the browser 120, and may be written in a client-side script language such as JavaScript or typescript. The management application 122 may follow a component-based architecture where the device configurator 124 is built using reusable components such as HTML templates (e.g., delivered by the web server 115), client-side script code (e.g., JavaScript or TypeScript), and styles.

An application developer can define an application to be executed on an end user device. Such an application may include a virtual desktop client, a cloud desktop, web applications (e.g., web browsers, word processing editors, spreadsheet applications, chat applications, team collaboration applications, email applications, social network applications, customer relationship manager applications, financial applications), device login, or other published applications. The applications may connect to external resources such as external resource servers (not shown in FIG. 1). The end user device may be one of many devices that are part of the same organization and configured by an administrator of the organization.

The application developer or administrator of an application can define or specify a set of configuration files that define the layout, dependencies, visualization of configuration parameters, and/or the parameter values, for an application. For example, the application developer can define the layout description file 140 and the parameter description file 145, which are used to describe the configuration pages and configuration parameters. The layout description file 140 references parameter objects in the parameter description file 145, which holds the parameter related information such as value, name, tooltip, etc. The values of the parameter description file 145 can be set by an administrator of the end user device, which may be different from the application developer. For example, the application developer may set default values (or not configure the values) and the administrator of the end user device can change the values according to their preference. The layout description file 140 and the parameter description file 145 are stored in the application configuration database 135.

In an embodiment, the layout description file 140 and the parameter description file 145 are provided by the application developer in structured files such as JavaScript Object Notation (JSON) files or Extensible Markup Language (XML) files. In another embodiment, the layout description file 140 and the parameter description file 145 are built by a configuration management system that includes a user interface with which the application developer can interact and interactively edit. The application developer can define the layout, dependencies, visualization of configuration parameters, and/or the parameter values the configuration parameters, using the user interface, and be able to preview or represent how the configuration pages will look to users. For example, the interactive editor may allow the user to define the UI components to be included on the configuration page, the position of such UI components, the style of the UI components (e.g., color, font, size, etc.), and the parameters of the UI components.

The management application 122 is a web-based application (e.g., running in a browser or a browser container) that is used to manage end user devices. The management application 122 may be a local configuration application used to locally configure an end user device or a central management application used to remotely configure an end user device (and typically multiple end user devices). The management application 122 can access the set of configuration files that define the layout, dependencies, visualization of configuration parameters, and/or the parameters for an application and/or the operating system of the end user device (e.g., the layout description file 140 and the parameter description file 145). For example, the management application 122 may use the configuration service API 125 of the configuration service 130 to retrieve the set of configuration files from the application configuration database 135. The device configurator 124 receives the set of configuration files (e.g., the layout description file 140 and the parameter description file 145) from the management application 122, and interprets them to build the configuration visualization of the device configurator 124. For example, the management application 122 may request and receive the current configuration files from the configuration service 130 (using the configuration service API); and forward them to the device configurator 124. The device configurator 124 parses the configuration files and builds the configuration visualization (the UI). For example, the device configurator 124 uses the layout description file 140 and the parameter description file 145 and creates HTML, CSS, and/or client-side code (e.g., JavaScript or TypeScript) to visualize the pages and parameters.

The device configurator 124 is used by a user (e.g., a system administrator) to configure end user devices. For example, the system administrator logs into a remote configuration management system for configuring end user devices under the control of the system administrator, and can navigate to the device configurator 124 that is then rendered by the web browser. The particular configuration settings that can be modified or set by the system administrator depends on the set of configuration files that are defined. With respect to an application that is provided by an application developer, the particular configuration settings that can be modified or set by the system administrator depends on the set of configuration files for the application that are typically defined by the application developer. If a configuration setting is modified or set, the configuration setting update is sent to the remote configuration management system for deployment of the configuration to the end user devices. For example, the management application 122 may use the configuration service API 125 to write the configuration update to the application configuration database 135. The administrator may use the configuration service 130 (which may be accessible through the device configurator 124) to deploy the configuration update to the end user devices.

Figure 2:
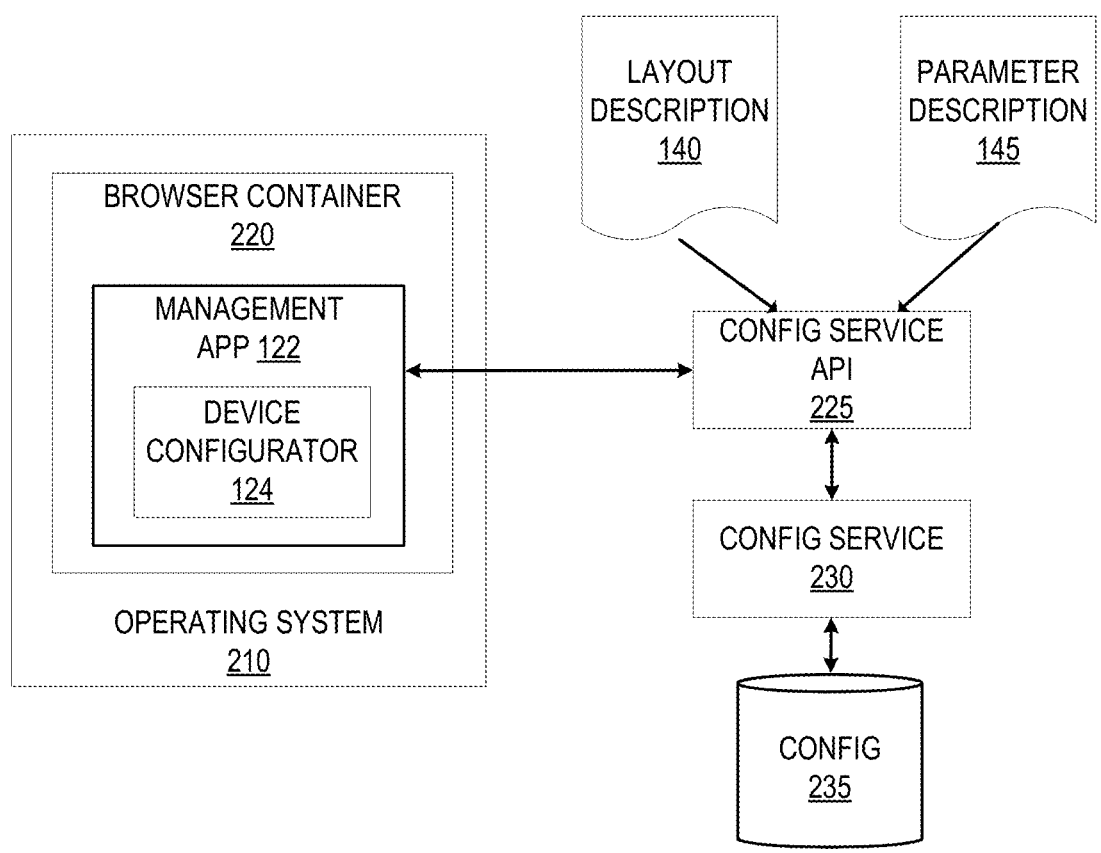
FIG. 2 illustrates a similar system for configuring an end user device on the end user device itself, according to an embodiment.

FIG. 1 illustrates a system for configuring end user devices remotely through a remote configuration management system. FIG. 2 shows a similar system for configuring an end user device on the end user device itself. Like described with respect to FIG. 1, the system can be used for configuring an operating system, application, and/or hardware components of the end user device. In the example shown in FIG. 2, an operating system 210 of the end user device executes a browser container 220, which executes the management application 122 and the device configurator 124. The device configurator 124 is built using the same layout description file 140 and parameter description file 145, which are retrieved by the management application 122 from the configuration service 230 through the configuration service API 225. The configuration settings are stored in the configuration data store 235. The components of FIG. 2 may be part of the operating system 210 running on the end user device.

A page description language (PDL) is used to define the layout description file 140. A page is a container element for a group of parameters that belong together. The page is also a structural element that can handle many parameters (e.g., thousands of parameters). A page can have one or more child pages. FIG. 3 shows an example layout description file 140 that shows a single page that has multiple elements. The attribute name of the page 312 is the same as the id attribute 314. The title of a page is given in the title attribute 316 of the page object. The source for the title value defines the identifier to check when searching for a translation value (if any). A page can have one or more children pages that are given with a children identifier attribute. A child page can include an attribute that specifics the parent page. In the example shown in FIG. 3, the page includes a parent identifier attribute 318 that specifies a parent page.

A page can include multiple page elements including one or more parameter page elements and one or more structure page elements. A parameter page element includes a parameter identifier that references a set of one or more configuration parameters in the parameter description file. FIG. 4 shows an example parameter description file 145 that corresponds to the example layout description file 140 shown in FIG. 3. A parameter page element allows the user to adjust or set a particular setting. With respect to FIG. 3, the page object shown includes the elements container attribute 322 that includes three page elements: page element 324, page element 326, and page element 328. The page element 324 is a parameter page element, the page element 326 is a structure page element, and the page element 328 is a parameter page element.

A parameter page element can be used to specify which UI element should be rendered in the configuration UI. A default representation can be defined for a particular parameter where the UI representation is derived from the parameter description file 145. Alternatively, a specific type of UI element can be defined to specify the type of UI element to render for the particular parameter. The different types of UI elements include any one or more of the following: a checkbox parameter element, a dropdown parameter element, a text field parameter element, a password text field parameter element, a text area parameter element, a slider parameter element, a color chooser parameter element, a file chooser parameter element, a radio button parameter element, a list parameter element, a table parameter element, a session table parameter element, a fixed session page parameter element, a button parameter element, a confirm password parameter element, and a session selector parameter element.

As an example of a checkbox parameter element, the layout description file 140 can include an attribute that specifies a default element should be used (as defined in the parameter description file 145), and the parameter description file 145 can include a UI type attribute with a value that specifies a Boolean choice. When interpreted by the device configurator 124, a checkbox UI component is generated for display for this parameter element.

As an example of a dropdown parameter element, the layout description file 140 can include an attribute that specifies a default element should be used (as defined in the parameter description file 145), and the parameter description file 145 can include a UI type attribute with a value that specifies a string, integer, or editable, and a non-empty range attribute that includes the values for the dropdown. When interpreted by the device configurator 124, a dropdown UI component is generated for display for this parameter element that includes the specified values. For example, the layout description file 140 of FIG. 3 includes the parameter page element 328 that includes: a type attribute that specifies a default element should be used, and a parameter identifier attribute 329 that specifies an identifier of the parameter in the parameter description file 145 (in this case "private_mode"). In the parameter description file 145 of FIG. 4, the parameter attribute 416 with the "private_mode" identifier includes a default value attribute 418 (set to enabled), a UI type attribute 420 with a value that specifies the type is editable; and a range attribute 422 that includes values for the dropdown, which in this case is enabled, disabled, and forced. The device configurator 124 interprets the example layout description file 140 of FIG. 3 and the example parameter description file 145 of FIG. 4 and renders a dropdown element with the choices enabled, disabled, and forced, for the administrator to define whether private mode for the browser application is enabled, disabled, or forced to be used.

As an example of a text field parameter element, the layout description file 140 can include an attribute that specifies a default element should be used (as defined in the parameter description file 145), and the parameter description file 145 can include a UI type attribute with a value that specifies a string or integer; and an empty or undefined range attribute. When interpreted by the device configurator 124, a text field UI component is generated for display for this parameter element that includes an empty text field that can be used to enter text values. For example, the layout description file 140 of FIG. 3 includes the parameter page element 324 that includes: a type attribute that specifies a default element should be used, and a parameter identifier attribute 325 that specifies the identifier of the parameter in the parameter description file 145 (in this case "home_page"). In the parameter description file 145 of FIG. 4, the parameter attribute 410 with the "home_page" identifier includes a UI type attribute 412 with a value that specifies a string and a display name attribute 414 that has a value that specifies a "Home Page" display name; the parameter with the "home_page" identifier includes an undefined range attribute. The device configurator 124 interprets the example layout description file 140 of FIG. 3 and the example parameter description file 145 of FIG. 4 and renders a text field for the administrator to define the home page (e.g., the URL) for a browser application.

As an example of a password text field parameter element, the layout description file 140 can include an attribute that specifies a default element should be used (as defined in the parameter description file 145), and the parameter description file 145 can include a UI type attribute with a value that specifies a string, a value attribute that is empty, and a parameter name that ends in password. When interpreted by the device configurator 124, a password text field UI component is generated for display for this parameter element that includes an empty text field that can be used to enter a password text value.

As an example of a text area parameter element, the layout description file 140 can include an attribute that specifies a default element should be used (as defined in the parameter description file 145), and the parameter description file 145 can include a UI type attribute with a value that specifies a multiline area. When interpreted by the device configurator 124, a text area UI component is generated for display for this parameter element that allows the administrator to enter text that may wrap over multiple lines. As another example of a text area parameter element, the layout description file 140 can include a type with a value specifying a text area UI component is to be displayed for the parameter. When interpreted by the device configurator 124, a text area UI component is generated for display for this parameter.

As an example of a slider parameter element, the layout description file 140 can include a type attribute with a value specifying a slider UI component is to be displayed for the parameter element. The layout description file 140 can also specify the minimum and maximum possible values for the slider UI component. The layout description file 140 can also specify whether ticks (small hints) on the slider line can be defined. When interpreted by the device configurator 124, a slider UI component is generated for display for this parameter element.

As an example of a color chooser parameter element, the layout description file 140 can include a type attribute with a value specifying a color chooser UI component is to be displayed for the parameter element. When interpreted by the device configurator 124, a color chooser UI component is generated for display for this parameter element.

As an example of a file chooser parameter element, the layout description file 140 can include a type attribute with a value specifying a file chooser UI component is to be displayed for the parameter element. The layout description file 140 can also specify specific file types that can be chosen by the user (e.g., image file types, document file types, text file types, etc.). When interpreted by the device configurator 124, a file chooser UI component is generated for display for this parameter element.

As an example of a radio button parameter element, the layout description file 140 can include a type attribute with a value that specifies a radio button list component is to be displayed for the parameter element. The layout description file 140 also specifies the identifier of the parameter, or identifiers of the parameters defined in the parameter description file 145 for the radio button options. When interpreted by the device configurator 124, a radio button list UI component is generated for display for this parameter element.

As an example of a list parameter element, the layout description file 140 can include a type attribute with a value that specifies a list component is to be displayed for this parameter element. The list component allows an administrator to define a list of items each containing one value. The layout description file 140 also includes an attribute specifying the identifier for the parameter defined in the parameter description file 145. The layout description file 140 may also include an attribute that specifies the type of operations that are available for the items in the list (e.g., add a new item to the list, edit a currently selected item, delete the currently selected item, copy the currently selected item, change the order of the currently selected item one position upwards, change the order of the currently selected item one position downwards). When interpreted by the device configurator 124, a list UI component is generated for display for this parameter element.

As an example of a table parameter element, the layout description file 140 can include a type attribute with a value that specifies a table component is to be displayed for this parameter element. The table component allows an administrator to configure settings that are shown in a table format. The layout description file 140 includes an attribute that specifies a column that is an array of objects, where each object references a parameter in the parameter description file 145. The layout description file 140 may also include an attribute that specifies the type of operations that are available for the items in the table (e.g., add a new item to the table, edit a currently selected item, delete the currently selected item, copy the currently selected item, change the order of the currently selected item one position upwards, change the order of the currently selected item one position downwards). When interpreted by the device configurator 124, a table UI component is generated for display for this parameter element.

As an example of a session table parameter element, the layout description file 140 can include a type attribute with a value that specifies a session table component is to be displayed for this parameter element. A session table is a type of table that can be used for creating new instances of session parameters, such as when creating a new web browsing session. The layout description file 140 includes an attribute that specifies aa session instance. When interpreted by the device configurator 124, a session table UI component is generated for display for this parameter element.

As an example of a fixed session page parameter element, the layout description file 140 can include a type attribute with a value that specifies a fixed session instance in a separate page is to be displayed for this parameter element. The layout description file 140 may include an attribute that identifies the parameter to use from the parameter description file 145; and may include an attribute whose value specifies the session page to use. When interpreted by the device configurator 124, a fixed session page UI component is generated for display for this parameter element.

As an example of a button parameter element, the layout description file 140 can include a type attribute with a value that specifies a button component is to be displayed for the parameter element. The layout description file 140 may include an attribute whose value provides the command to be executed by the system when the button is selected; or include an attribute whose value provides an identifier for a command to be executed by the system when the button is selected. When interpreted by the device configurator 124, a button UI component is generated for display for this parameter element.

As an example of a confirm password parameter element, the layout description file 140 can include a type attribute with a value that specifics a confirm password component is to be displayed for the parameter element. The layout description file 140 can specify whether the confirm password component can remain empty. When interpreted by the device configurator 124, a confirm password UI component is generated for display for this parameter element.

As an example of a session selector parameter element, the layout description file 140 can include a type attribute with a value that specifies a session selector component is to be displayed for the parameter element. The session selector component allows an administrator to select a session. When interpreted by the device configurator 124, a session selector UI component is generated for display for this parameter element.

The layout description file 140 can also define a custom page element. The layout description file 140 can include a type attribute with a value that specifies a custom page element.

The layout description file 140 can define parameters that are resolved during time (dynamically). To specify a dynamic parameter, the layout description file 140 can include a dynamic parameter identifier attribute whose value is defined in the parameter description file 145. When such a page is opened, the parameter data for the dynamic parameter identifier is retrieved and applied.

A structure page element is a UI element to structure the page. Example structure page elements include a separator and a label. A separator is used to display a separator line (e.g., between two page elements). The layout description file 140 can include a UI type attribute with a value that specifies a separator. When interpreted by the device configurator 124, a separator UI component (e.g., a separator line) is displayed between this structure page element and the preceding page element. For example, the layout description file 140 of FIG. 3 includes the structure page element 326 that includes: a type attribute that specifies a separator line should be rendered between the page elements 324 and 328. The device configurator 124 interprets the example layout description file 140 of FIG. 3 and will render a separator line between the UI elements rendered for the page elements 324 and 328.

A label is used for displaying text to the user (e.g., for a caption). The layout description file 140 can include a type attribute with a value that specifies a label to be used. The value of the parameter can be defined through the layout description file 140 or the parameter description file 145.

The layout description file 140 can define page element objects that have a dependencies attribute. A dependency is an attribute of a page element that alters the behavior or rendering of that page element (sometimes referred herein as a dependent page element) based on the state or values of another page element (sometimes referred herein as a controlling page element). Any page element can include such a dependencies attribute.

As an example, a particular page element can be enabled or disabled based on the value of a parameter of a different page element. In such a case, a defined action (e.g., enable or disable) is applied to the dependent page element based on the value of the parameter of the controlling page element. To specify such a dependent control, the layout description file 140 can include a dependency attribute array with: an attribute that specifies the identifier of the controlling parameter element; an attribute that specifies the parameter value(s) of the controlling parameter element that would trigger the action; and an attribute that specifies the dependency action (e.g., enable, disable). When interpreted by the device configurator 124, the page element is configured to behave as a conditional page element as defined.

As an example, a particular page element can be shown or hidden based on the value of a parameter of a different page element. In such a case, a defined action (e.g., show or hide) is applied to the dependent page element based on the value of the parameter of the controlling page element. To specify such a dependent control, the layout description file 140 can include a dependency attribute array with: an attribute that specifies the identifier of the controlling parameter element; an attribute that specifies the parameter value(s) of the controlling parameter element that would trigger the action; and an attribute that specifies the dependency action (e.g., show, hide). When interpreted by the device configurator 124, the page element is configured to behave as a conditional page element as defined. FIG. 5 shows the example layout description file 140 of FIG. 3 including a page element that has a dependencies attribute. In the example of FIG. 5, the intention is to make pop-up exceptions be shown by the device configurator 124 when a popup configuration parameter is enabled. The parameter page element 524 includes a parameter identifier attribute 526 with a value of "popup_exceptions"; and a dependencies attribute array 528 that: includes an attribute 530 that specifies the identifier of the controlling parameter element; an attribute 532 that specifies the parameter value(s) of the controlling parameter element that would trigger the action (in this case "enabled"); and an attribute 534 that specified the dependency action to take (in this case "show" the parameter page element identified by the parameter identifier "popup_exceptions"). The device configurator 124 interprets the example layout description file 140 of FIG. 5 and will show the popup_exceptions parameter page element if the value of the popup_config parameter page element is set to enabled.

As another example, a parameter's value can be set depending on the value of another parameter. This means that when the value of a controlling parameter is changed, the value of the dependent parameter may also be automatically changed. To specify such a dependent control, the layout description file 140 can include a dependency attribute array with: an attribute that specifies the identifier of the controlling parameter element; an attribute that specifies the dependency action (e.g., set value); and a value mapping attribute that specifics a mapping of controlling parameter values to dependent parameter values that would trigger the action. When interpreted by the device configurator 124, the page element is configured to behave as a conditional page element as defined.

As another example, a parameter's value can disable or hide range elements. To specify such a dependent control, the layout description file 140 can include a dependency attribute array with: an attribute that specifies the identifier of the controlling parameter element; an attribute that specifies the dependency action (e.g., disable, hide); an attribute that specifies the parameter value(s) of the controlling parameter element that would trigger the action; and an attribute that specifies the range of elements that are to affected by the action. When interpreted by the device configurator 124, the page element is configured to behave as a conditional page element as defined.

As another example, a particular page element can be shown or hidden based on the application that is currently being configured. To specify such a dependent control, the layout description file 140 can include a dependency attribute array with: an attribute that specifies the identifier of the controlling application; and an attribute that specifies the dependency action (e.g., show, hide). When interpreted by the device configurator 124, the page element is configured to behave as a conditional page element as defined.

The layout description file 140 can define a page that depends on a value of a parameter of another element. For example, a particular page can be disabled, enabled, hidden, or shown, based on the value of a parameter of a particular page element. In such a case, the defined action (e.g., disabled, enabled, hidden, or shown) is applied to the page as a whole based on the value of the parameter of the controlling page element. To specify such a dependent control, the layout description file 140 can include a dependency attribute array with: an attribute that specifies the identifier of the controlling parameter element; an attribute that specifies the parameter value(s) of the controlling parameter element that would trigger the action; and an attribute that specifies the dependency action (e.g., disable, enable, show, hide). When interpreted by the device configurator 124, the page is configured to behave as a conditional page as defined.

The layout description file 140 can define validators for parameters such that the UI can handle valid or invalid input. Example validators include: a hexadecimal validator that validates whether the input value is in hexadecimal format; an integer validator that validates whether the input value is an integer; an integer range validator that validates whether the input value is within a permitted range of integer values; a special characters validator that validates whether the input value does not contain any forbidden special characters; a length validator that validates whether the input value is within a permitted length; a regular expression validator that validates a value of a parameter using a defined regular expression.

Figure 6:
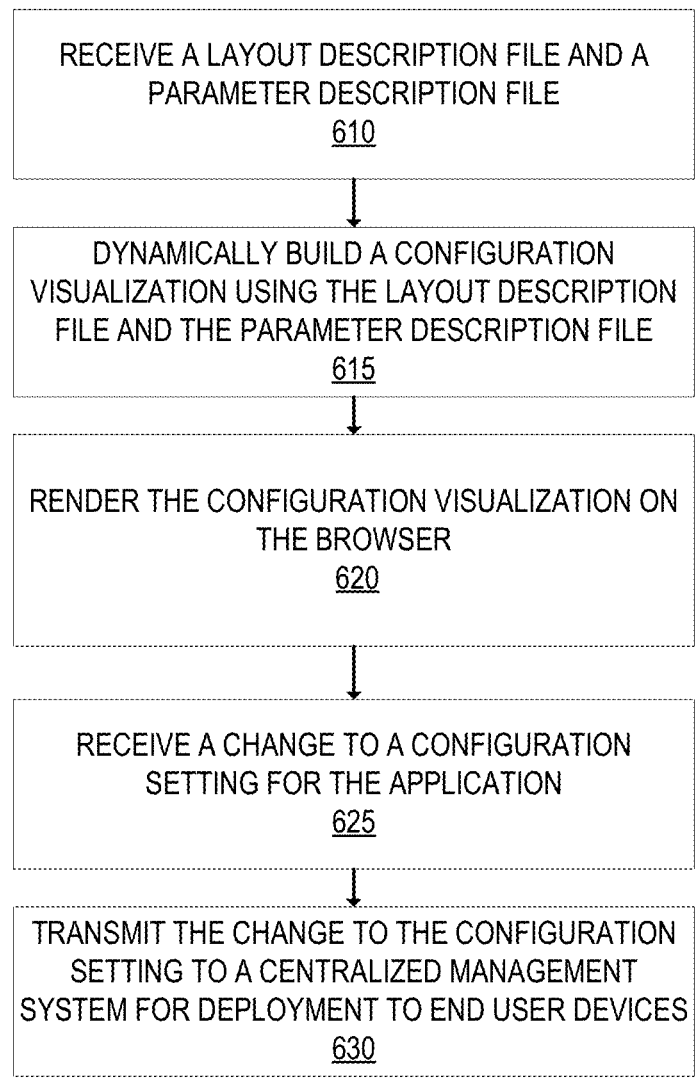
FIG. 6 is a flow diagram that illustrates exemplary operations for configuring an end user device according to an embodiment.

FIG. 6 is a flow diagram that illustrates exemplary operations for configuring an end user device according to an embodiment. The operations of FIG. 6 are described with respect to the other figures. However, the operations of FIG. 6 can be performed by embodiments different from that of the other figures, and the other figures can perform operations different from that of FIG. 6.

At operation 610, a layout description file 140 and a parameter description file 145 are received. The layout description file 140 specifies a configuration page for configuring settings of an application installed or to be installed on an end user device. The layout description file 140 includes multiple page elements each including multiple parameter page elements. Each parameter page element is used for rendering a UI element for that page element. Example types of UI elements include: a checkbox parameter element, a dropdown parameter element, a text field parameter element, a password text field parameter element, a text area parameter element, a slider parameter element, a color chooser parameter element, a file chooser parameter element, a radio button parameter element, a list parameter element, a table parameter element, a session table parameter element, a fixed session page parameter element, a button parameter element, a confirm password parameter element, and a session selector parameter element. Each parameter page element includes a parameter identifier that references a set of one or more configuration parameters in the parameter description file 145. The layout description file 140 may also include one or more structure page elements that structure the page. Such a structure page element may be a separator element.

The layout description file 140 and the parameter description file 145 may be received at the device configurator 124. The management application 122 may retrieve the layout description file 140 and the parameter description file 145 from the application configuration database 135 using the configuration service API 125, and provide the files to the device configurator 124. The layout description file 140 and the parameter description file 145 may be defined by an application developer as previously described. A page description language can be used to define the layout description file 140. The layout description file 140 and the parameter description file 145 may be structured files such as JSON or XML files.

Next, at operation 615, the device configurator 124 dynamically builds a configuration visualization using the layout description file 140 and the parameter description file 145. For example, the device configurator 124, which is executed by the browser, interprets the key-values of the layout description file 140 and the parameter description file 145 to generate the configuration visualization as defined by the files. Building the configuration visualization may include the device configurator 124 taking the layout description file 140 and the parameter description file 145 and generating HTML, CSS, and/or client-side code (e.g., JavaScript or TypeScript) to visualize the pages and parameters. Next, at operation 620, the configuration visualization of the device configurator 124 is rendered on the browser 120.

The user of the device configurator 124, for example a system administrator, may then make configuration settings for the application. At operation 625, at least one change to a configuration setting for the application is received through the configuration visualization of the device configurator 124. The change may be a modification of a value, a setting of a value, or a deletion of a value. At operation 630, the at least one change is transmitted to a centralized management system for deployment of the configuration to end user devices that are administered by the system administrator. For example, the device configurator 124 may use the management application 122 to make an API call using the configuration service API 125 to write the configuration update to the application configuration database 135. The administrator may use the configuration service 130 (which may be accessible through the device configurator 124) to deploy the configuration update to the end user devices.

Embodiments described herein allow application developers to easily define and construct configuration pages for applications remotely without the need to customize a user interface or without updating code. Embodiments described herein allow the parameterization of end user devices to be provided automatically in graphical user interfaces of centralized management software. New functionality (e.g., updated configuration options) can be provided without making changes to the administration software or the applications themselves.

Figure 7:
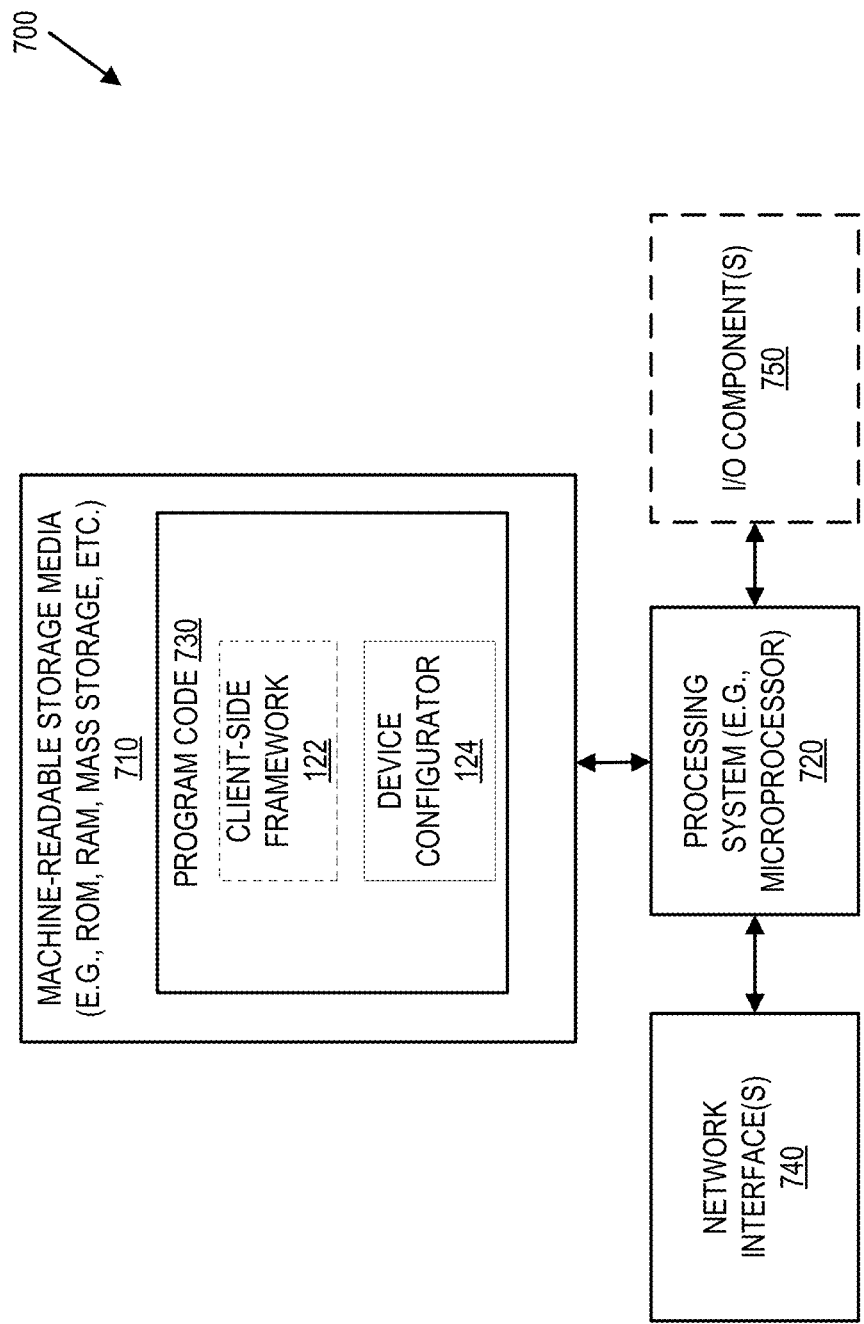
FIG. 7 is a block diagram illustrating a data processing system that can be used in an embodiment.

FIG. 7 illustrates a block diagram for an exemplary data processing system 700 that may be used in some embodiments. One or more such data processing systems 700 may be utilized to implement the embodiments and operations described with respect to a device used by an administrator to configure an end user device, or an end user device. Data processing system 700 includes a processing system 720 (e.g., one or more processors and connected system components such as multiple connected chips).

The data processing system 700 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals-such as carrier waves, infrared signals), which is coupled to the processing system 720. For example, the depicted machine-readable storage media 710 may store program code 730 that, when executed by the processing system 720, causes the data processing system 700 to execute the management application 122, the device configurator 124, and/or perform the operations described herein.

The data processing system 700 also includes one or more network interfaces 740 (e.g., a wired and/or wireless interfaces) that allows the data processing system 700 to transmit data and receive data from other computing devices, typically across one or more networks (e.g., Local Area Networks (LANs), the Internet, etc.). The data processing system 700 may also include one or more input or output ("I/O") components 750 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 700, and, in certain embodiments, fewer components than that shown in One or more buses may be used to interconnect the various components shown in FIG. 7.

The techniques shown in the figures can be implemented using code and data stored and executed on one or more electronic devices (e.g., an end user device, a configuration server, a device for accessing the device configurator). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals-such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth in order to provide a more thorough understanding. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving a layout description file and a parameter description file, wherein the layout description file specifies a configuration page for configuring settings of an application installed on an end user device, wherein the layout description file includes a plurality of page elements including a plurality of parameter page elements, wherein each of the plurality of page elements is used for rendering a user interface (UI) element for that page element, and wherein the plurality of parameter page elements each include a parameter identifier that references a set of one or more configuration parameters in the parameter description file;
   dynamically building a configuration visualization using the layout description file and the parameter description file;
   rendering the configuration visualization on a web browser;
   receiving, through the configuration visualization, at least one change to a configuration setting for the application; and
   transmitting the at least one change to the configuration setting for the application to a centralized management system for deployment of the configuration setting to a plurality of end user devices.

2. The method of claim 1, wherein the plurality of page elements further include a set of one or more structure page elements that structure the configuration page.

3. The method of claim 1, wherein at least one of the plurality of parameter page elements includes a dependencies attribute that defines a behavior or rendering of that parameter page element based on state or values of another one of the plurality of parameter page elements.

4. The method of claim 3, wherein the rendering of that parameter page element is controlled by a specific parameter value of a specified another one of the plurality of parameter page elements.

5. The method of claim 1, wherein the layout description file and the parameter description file are defined by an application developer of the application.

6. The method of claim 1, wherein dynamically building the configuration visualization includes generating HTML, CSS, and/or client-side scripts to visualize a UI for the configuration page and parameters as defined by the layout description file and the parameter description file.

7. The method of claim 1, wherein the UI element is one of: a checkbox parameter element, a dropdown parameter element, a text field parameter element, a password text field parameter element, a text area parameter element, a slider parameter element, a color chooser parameter element, a file chooser parameter element, a radio button parameter element, a list parameter element, a table parameter element, a session table parameter element, a fixed session page parameter element, a button parameter element, a confirm password parameter element, and a session selector parameter element.

8. A non-transitory machine-readable storage medium that provides instructions that, if executed by a processor, will cause operations to be performed comprising:
   receiving a layout description file and a parameter description file, wherein the layout description file specifies a configuration page for configuring settings of an application installed on an end user device, wherein the layout description file includes a plurality of page elements including a plurality of parameter page elements, wherein each of the plurality of page elements is used for rendering a user interface (UI) element for that page element, and wherein the plurality of parameter page elements each include a parameter identifier that references a set of one or more configuration parameters in the parameter description file;

dynamically building a configuration visualization using the layout description file and the parameter description file;

rendering the configuration visualization on a web browser;

receiving, through the configuration visualization, at least one change to a configuration setting for the application; and transmitting the at least one change to the configuration setting for the application to a centralized management system for deployment of the configuration setting to a plurality of end user devices.

9. The non-transitory machine-readable storage medium of claim 8, wherein the plurality of page elements further include a set of one or more structure page elements that structure the configuration page.

10. The non-transitory machine-readable storage medium of claim 8, wherein at least one of the plurality of parameter page elements includes a dependencies attribute that defines a behavior or rendering of that parameter page element based on state or values of another one of the plurality of parameter page elements.

11. The non-transitory machine-readable storage medium of claim 10, wherein the rendering of that parameter page element is controlled by a specific parameter value of a specified another one of the plurality of parameter page elements.

12. The non-transitory machine-readable storage medium of claim 8, wherein the layout description file and the parameter description file are defined by an application developer of the application.

13. The non-transitory machine-readable storage medium of claim 8, wherein dynamically building the configuration visualization includes generating HTML, CSS, and/or client-side scripts to visualize a UI for the configuration page and parameters as defined by the layout description file and the parameter description file.

14. The non-transitory machine-readable storage medium of claim 8, wherein the UI element is one of: a checkbox parameter element, a dropdown parameter element, a text field parameter element, a password text field parameter element, a text area parameter element, a slider parameter element, a color chooser parameter element, a file chooser parameter element, a radio button parameter element, a list parameter element, a table parameter element, a session table parameter element, a fixed session page parameter element, a button parameter element, a confirm password parameter element, and a session selector parameter element.

15. A device, comprising:
a set of one or more processors; and
a non-transitory machine-readable storage medium that provides instructions that, when executed by the set of one or more processors, cause the device to perform operations comprising:
receiving a layout description file and a parameter description file, wherein the layout description file specifies a configuration page for configuring settings of an application installed on an end user device, wherein the layout description file includes a plurality of page elements including a plurality of parameter page elements, wherein each of the plurality of page elements is used for rendering a user interface (UI) element for that page element, and wherein the plurality of parameter page elements each include a parameter identifier that references a set of one or more configuration parameters in the parameter description file;
dynamically building a configuration visualization using the layout description file and the parameter description file;
rendering the configuration visualization on a web browser;
receiving, through the configuration visualization, at least one change to a configuration setting for the application; and
transmitting the at least one change to the configuration setting for the application to a centralized management system for deployment of the configuration setting to a plurality of end user devices.

16. The device of claim 15, wherein the plurality of page elements further include a set of one or more structure page elements that structure the configuration page.

17. The device of claim 15, wherein at least one of the plurality of parameter page elements includes a dependencies attribute that defines a behavior or rendering of that parameter page element based on state or values of another one of the plurality of parameter page elements.

18. The device of claim 17, wherein the rendering of that parameter page element is controlled by a specific parameter value of a specified another one of the plurality of parameter page elements.

19. The device of claim 15, wherein the layout description file and the parameter description file are defined by an application developer of the application.

20. The device of claim 15, wherein dynamically building the configuration visualization includes generating HTML, CSS, and/or client-side scripts to visualize a UI for the configuration page and parameters as defined by the layout description file and the parameter description file.

21. The device of claim 15, wherein the UI element is one of: a checkbox parameter element, a dropdown parameter element, a text field parameter element, a password text field parameter element, a text area parameter element, a slider parameter element, a color chooser parameter element, a file chooser parameter element, a radio button parameter element, a list parameter element, a table parameter element, a session table parameter element, a fixed session page parameter element, a button parameter element, a confirm password parameter element, and a session selector parameter element.

* * * * *